United States Patent Office 3,429,777
Patented Feb. 25, 1969

3,429,777
HIGH PURITY MAGNESIUM LACTATE
FROM STEEPWATER
Harold Eli Bode, Room 308, Schofield Bldg.,
Cleveland, Ohio 44115
No Drawing. Continuation-in-part of application Ser. No. 437,010, Mar. 1, 1965. This application Sept. 24, 1965, Ser. No. 490,054
U.S. Cl. 195—48      6 Claims
Int. Cl. C12d 1/02; C07c 59/08

ABSTRACT OF THE DISCLOSURE

Corn steepwater contains lactic acid and active lactic acid creating microorganisms. By using an inorganic magnesium compound as the lactic acid neutralizing agent and removing the resulting insoluble magnesium phytate compound, the magnesium lactate in the filtrate is capable of crystallizing in a state of high purity. By adding molasses to the lactic microorganisms in the steepwater, the amount of recoverable high purity magnesium lactate crystals is increased.

---

This application is a continuation-in-part of my pending application, Ser. No. 437,010, filed on Mar. 1, 1965.

This invention relates to the production of high purity magnesium lactate from crude, highly impure, lactic acid solutions contaminated with soluble proteins and soluble organic phosphates.

One of the objects of the invention is to provide a means for economically removing a metal lactate from a crude lactic acid liquor in a degree of purity which makes possible the direct recovery of a refined metal lactate from crude lactic acid liquor.

Another object of the invention is the direct production of high purity magnesium lactate from a crude lactated incubated steepwater liquor.

Another object of the invention is to provide a magnesium reagent economy for magnesium lactate production whereby the magnesium reagent can be economically recovered and reused subsequent to serving as a means for producing a magnesium lactate solution from a crude calcium lactate liquor.

Still another object of the invention is to exploit the low cost lactic acid microorganisms of aqueous grain extracts, such as corn steepwater, as a means for producing cheap lactic acid liquors from molasses.

Still another object of the invention is to further enhance lactic acid economy by using corn steepwater as a vehicle for fermenting the sugars in low cost crude carbohydrate liquors such as molasses; and to simultaneously exploit the ability of magnesium lactate to crystallize out of the resulting fermented liquors in a state of purity sufficient to enable the direct production of high grade lactic acid from the recovered magnesium lactate.

I have found that magnesium lactate has unusual crystallizing or precipitating properties when it is present in crude lactic acid liquors containing organic nitrogen or phosphate solubles, such as are present in grain steepwater or in molasses.

Although the steepwater obtained by the water soaking of any grain could serve as a starting material for introducing the lactic acid microorganisms exploited in this invention, the preferred steepwater is the commercial commodity known as corn steepwater. This is a by-product obtained in a wet corn milling plant by steeping or soaking whole corn in water containing a small amount of sulfur dioxide as a preservative to inhibit putrifaction. Corn steepwater, in additon to the presence within it of live lactic acid microorganisms, contains, on a dry basis, about 5 to 10 percent of lactic acid, 50 to 55 percent protein, 10 percent of metal phytates, and has an ash content of 15 to 20 percent.

Because of the presence of live lactic acid microorganisms, light steepwater coming from the corn steeps in a wet corn milling plant can be fermented, or what is known in the trade, can be incubated to convert any remaining free sugars in the steepwater to lactic acid. Commercial incubated steepwater is produced by allowing light steepwater to ferment at 125° F. for 2 to 3 days; whereupon any remaining free sugars are converted by the lactic acid microorganisms of the steepwater to lactic acid. The resulting incubated light steepwater is then concentrated in a vacuum pan to a dry substance content of about 50 to 52 percent. This concentrated product is then shipped commercially as incubated steepwater.

Since incubated steepwater is actually steepwater whose carbohydrates have been lactated to lactic acid, I desire to designate the term "lactated" as a word meaning the conversion of sugars or other carbohydrate material in a liquor to lactic acid. Thus, in accordance with this definition, a lactated steepwater is a steepwater whose carbohydrates have been fermentatively partially or completely converted to lactic acid. Similarly, a lactated molasses is a molasses whose sugars have been fermentatively partially or completely converted to lactic acid.

It has been found, that if a lactated steepwater or a lactated blend of steepwater with some other crude sugar liquor, such as molasses, is treated with sufficient magnesium hydroxide, or magnesium oxide, or magnesium carbonate, to neutralize the free lactic acid; then the resulting magnesium lactate is capable of crystallizing out of such a crude liquor in a form wherein, with very little subsequent further refining, a substantially pure magnesium lactate is obtained.

This is an unexpected phenomenon since it is known that calcium lactate, or other metal lactate salts, when formed in crude lactic acid liquids, crystallizes out in a very crude form. Because of this, it has never been possible in the past, to obtain a sufficiently pure calcium lactate from corn steepwater or from molasses, to be able to economically directly transform the resulting calcium lactate to an edible or refined grade lactic acid.

Because of these facts, present edible or well refined grades of lactic acid are commercially produced from calcium lactate by either starting with refined sugar as the fermentation substrate, or by starting with a crude sugar liquor such as diluted molasses, forming calcium lactate during the lactic acid fermentation of the said diluted molasses, and then subjecting the resulting very crude calcium lactate to a series of resolution and recrystallization steps until a calcium lactate of sufficient purity is obtained.

In contrast to the above complicated and costly procedure, the process of this invention enables one to start with a very crude liquor, and to directly obtain from the said crude liquor, a refined magnesium lactate capable of transformation into a well refined, edible grade lactic acid.

The degree of purity of magnesium lactate crystallizing in crude sugar liquors will vary depending upon the particular substrate. However, regardless of which sugar liquor substrate serves as the lactic fermentation raw material, the magnesium lactate formed by neutralizing with a magnesium reacting compound, will be found to be of radically greater purity than calcium lactate which is obtained when the same crude lactic acid liquors are neutralized with a calcium compound such as lime or calcium carbonate.

The advantage of magnesium lactate over calcium lactate is not only the matter of greater purity of the separated metal lactate crystals, but it is also a matter of obtaining a considerably higher yield of metal lactate compound during a first crystallization. Thus, in the case of lactated steepwater, a neutralization with lime followed by a calcium lactate crystallization results in the recovery of only 35 parts of calcium lactate per 100 parts of dissolved calcium lactate. In contrast to this, the same lactated steepwater, with a magnesium compound neutralization, will result in a yield of over 70 parts of magnesium lactate per 100 parts of dissolved magnesium lactate.

In addition to the greater metal yield, the magnesium lactate has still another advantage, namely it is capable of readily settling out from a crude lactated steepwater liquor; and the resulting settled layer of magnesium lactate is in the form of a substantially pure product.

Example One.—Magnesium lactate from light steepwater

A 5 Be light corn steepwater liquor having a dry basis lactic acid content of 11.2 percent and containing 100 parts by weight of dry substance was subjected to an incubated lactic acid fermentation. This consisted of incubating or allowing the lactic acid microorganisms within the light steepwater to fermentatively convert the remaining free sugar in the light steepwater dry substance to lactic acid. This was done by allowing the mildly agitated light steepwater liquor to ferment at 125° F. for 72 hours.

This produced an incubated light steepwater whose dry substance contained 25.6 percent lactic acid. A sufficient amount of magnesium hydroxide was then added to neutralize the lactic acid to magnesium lactate.

Upon cooling to room temperature, and allowing the resulting crude magnesium lactate light steepwater liquor to remain quiescent for 24 hours, two layers of suspended precipitates settled at the bottom of the treated steepwater liquor. The upper layer was a substantially pure white crystalline precipitate consisting primarily of magnesium lactate. The lower layer was darker colored material which comprised magnesium phytates and other non-lactate steepwater insolubles.

Upon decanting the upper layer of clear steepwater liquor, the bottom layer, consisting in turn of two layers of precipitates, was again decanted in a manner which separated the upper magnesium lactate precipitate layer from the bottom layer of phytate and other steepwater insolubles.

Upon filtering the upper precipitate layer of magnesium lactate and washing the filter cake with a cold magnesium lactate solution, it was found that the filter cake, on a dry basis, consisted of 99.3 percent magnesium lactate.

Example Two.—Magnesium lactate from heavy incubated steepwater

The incubated steepwater of Example One containing 25.6 percent lactic acid, dry basis, was concentrated in a wet corn milling plant steepwater vacuum pan to 15 Be. The heavy incubated steepwater having a pH of 3.9 was filtered hot in the presence of Dicalite filter aid.

A sufficient amount of magnesium hydroxide was then added to increase the steepwater pH to 6.0. The precipitated magnesium phytate was filtered hot and the filtrate vacuum concentrated to 22 Be. Upon cooling to room temperature, magnesium lactate crystals of high purity separated out. These were filtered and washed with cold water to inhibit magnesium lactate solution. The steepwater filtrate was then vacuum concentrated to 27 Be and another batch of high purity magnesium lactate crystals was obtained.

Example Three.—Magnesium lactate from steepwater-molasses solution blends

To light non-incubated corn steepwater there was added a sufficient amount of heat sterilized 43 Be blackstrap molasses to result in a steepwater-molasses liquor containing 40 percent of free sugars, on a dry basis.

A sufficient amount of light steepwater containing active lactic acid microorganisms was then added to the above molasses-steepwater mixture to sufficiently dilute the liquor to a point where its free sugar content was 15 percent.

The resulting 15 Brix steepwater crude sugar liquor was then incubated or fermented at 125° F. to convert the free sugars to lactic acid. During this lactic acid fermentation the pH of the liquor was kept between 4.0 and 3.8 by additions of magnesium carbonate.

After the completion of the lactic acid fermentation, sufficient magnesium hydroxide was added to adjust the pH of the liquor to 6.0. During this addition of magnesium hydroxide the liquor was rapidly heated to 180° F. The hot liquor, consisting of magnesium lactate solution and a precipitate of magnesium phytate and other steepwater insolubles, was filtered. The filtrate consisting of magnesium lactate, various steepwater solubles, and molasses solubles, was cooled to room temperature. After standing at room temperature for 12 hours, the crystallized magnesium lactate was centrifuged and washed with a small amount of cold water. The filtrate from the centrifuging operation was vacuum concentrated to 25 Be, and allowed to crystallize at room temperature for 15 hours. The resulting second batch of magnesium lactate crystals was centrifuged.

The above operations yielded 73 parts of pure magnesium lactate per 100 parts of lactic acid.

The liquor from the second crystallization and centrifuging steps can, after carbon refining, and a third crystallization, produce a third batch of high purity magnesium lactate crystals.

The residual liquor from the crystallization steps. upon treatment with soda ash, produces a sodium lactate solution and a precipitate of magnesium carbonate which can be filtered off and reused for reacting with fresh batches of crude lactic acid liquor.

In addition to the ability of the addition of a magnesium compound lactic acid neutralizing agent to produce high purity magnesium lactate from a very crude lactic acid liquor, such as incubated steepwater, the use of such magnesium neutralizing agents creates a distinct economic advantage over prior art commercial lactic acid manufacture involving the obtainment of lactic acid from calcium lactate. Since the magnesium lactate is recovered in high purity from crude liquors, it is possible to liberate free lactic acid from magnesium lactate and produce inorganic magnesium compounds of high purity and enhanced economic value. For example, a high grade sodium lactate liquor is produced by adding soda ash, caustic soda or sodium phosphate to a refined magnesium lactate solution. This results in the simultaneous production of high purity magnesium carbonate, magnesium hydroxide, or magnesium phosphate, all of which have a much higher economic value than the corresponding calcium salts.

It has also been found that, for the production of pure lactic acid from magnesium lactate, it is possible to produce high grade lactic acid by suspending dry, anhydrous magnesium lactate obtained from steepwater into methanol containing sufficient sulfuric acid to produce the stoichiometric equivalent of magnesium sulfate.

It has been found that magnesium lactate dissolves in cold anhydrous methanol, and the resulting insoluble magnesium sulfate can be readily removed as a precipitate. Upon subjecting the remaining liquid mixture of methanol and free lactic acid to a fractional low temperature distillation, a free lactic acid liquid of high purity is obtained.

Another example wherein a magnesium compound economy offers advantages over calcium is that of using magnesium sulfate to produce magnesium lactate. In contrast to the insoluble calcium sulfate, the soluble magnesium sulfate offers a means of producing magnesium lactate from lime-neutralized steepwater and simultaneously produce valuable calcium salts of phytin material. Thus, it has been found, that a batch of incubated steepwater containing blackstrap molasses as described in Example Three, but having had its pH adjusted during the lactic acid fermentation by means of lime instead of magnesium hydroxide, to a pH of 4.0, can, after this fermentation, have the calcium phytate precipitate removed, and then further neutralized with lime to 7.0 pH. Upon filtering the hot 7.0 pH lime treated incubated steepwater to further remove the additionally precipitated insoluble lime phytate and other insoluble calcium compounds, the addition of magnesium sulfate to the resulting hot filtrate of calcium lactate liquor, results in the production of a hot magnesium lactate liquor and a removable precipitate of calcium sulfate.

This procedure enables one to avoid the production of excessive amounts of non-lactic insoluble organic magnesium compounds such as the phytates or insoluble magnesium protein salts. The avoidance of excessive amounts of organic magnesium compounds is sometimes desirable for certain animal feed products.

By creating the magnesium lactate in incubated steepwater after the removal of whatever insolubles appear in a lime neutralized 7.0 pH incubated steepwater liquor, a remaining crude calcium lactate steepwater liquor is obtained which, upon the addition of magnesium sulfate, makes possible higher yields of magnesium lactate from the lactic acid in the steepwater liquor.

Example Four.—Magnesium lactate from phytate-removed steepwater

The following example illustrates a magnesium lactate steepwater extraction wherein the magnesium reagent is recovered and reused for further magnesium lactate production.

Light incubated corn steepwater containing 27.5 percent of lactic acid, on a steepwater dry substance basis, and heated to 165° F., was mixed with lime until the pH of the liquor was 5.3. A heavy precipitate of calcium phytate contaminated with protein was produced. This precipitant was allowed to settle, and the supernatant liquor consisting of a calcium lactate solution contaminated with proteins and steepwater soluble ash materials was decanted from the settled phytate precipitate.

The calcium phytate precipitate can either be refined with alkali or other materials to remove the contaminated protein and produce a refined calcium phytate; or this crude precipitate can be blended in with other wet corn milling feedhouse materials to produce gluten feed or gluten meal products.

The supernatant lime-neutralized lactated steepwater liquor was then filtered hot in the presence of Dicalite filter aid. The resulting filtered crude lactated steepwater calcium lactate solution was then reacted with a sufficient amount of a concentrated magnesium sulfate solution to cause the removal of the calcium from the calcium lactate by the formation of an insoluble precipitate of calcium sulfate.

then filtered hot, and the remaining crude magnesium lactate solution was evaporated in a vacuum pan to 15 Be.

The liquor containing the above gypsum precipitate was Upon cooling to room temperature, and allowing the cooled batch to stand for 12 hours, a white crystalline precipitate consisting of substantially pure, refined magnesium lactate was obtained. The cold liquor was centrifuged to remove the magnesium lactate. The wet magnesium lactate crystals were washed with a cold dilute aqueous solution of pure magnesium lactate. The resulting high purity magnesium lactate was then dehydrated in a drying oven. The resulting batch of anhydrous magnesium lactate crystals was then suspended in a tank containing anhydrous methanol to which there had been added a sufficient amount of sulfuric acid to react with the magnesium in the magnesium lactate to produce the equivalent amount of magnesium sulfate.

There resulted a liquor suspension comprising precipitated magnesium sulfate, methanol, and the equivalent amount of free liquid lactic acid dissolved in the methanol. Upon filtering to remove the magnesium sulfate, the remaining solution mixture of methanol and lactic acid was fractionatively distilled to remove the methanol whose boiling point is radically lower than that of liquid lactic acid.

The recovered magnesium sulfate was then dried to remove any methanol. This magnesium sulfate was then ready for reuse for treating a fresh batch of lime-neutralized incubated steepwater.

Since lactic acid is soluble in methanol in all proportions, it has been found that it is possible, if so desired, to add more than one batch of dry magnesium lactate to the methanol, after the removal of the precipitated magnesium sulfate. The limited solubility of magnesium lactate in methanol limits the amount that can be added to methanol for subsequent magnesium sulfate precipitation.

The mother liquor from the first magnesium lactate crystallization can either be further concentrated and subjected to a second crystallization, such as is described in Example Two. In spite of the fact that the steepwater magnesium lactate solution contains substantial amounts of soluble proteins and soluble ash materials, it has been found, unexpectedly, that the magnesium lactate crystallizes out of this crude liquor in a pure form. This is in contrast to calcium lactate which crystallizes out of crude steepwater or even crude sugar liquors in a very impure form.

The process described in Example Four can also be advantageously used with an incubated steepwater liquor wherein the incubation has taken place in the presence of large amounts of added molasses or other low cost lactic fermentable carbohydrates. In place of blackstrap molasses, it is possible to use beet molasses, wood sugar molasses, or various sugar-containing hydrolyzates obtained by either the enzymatic or acid hydrolysis of various crude monosaccharide polymer materials such as starches, dextrins, gums, cellulosic materials, sucrose, and pentosans.

While specific examples for carrying out this invention have been submitted, the invention is not limited to the specific narrow conditions illustrated in the examples. Thus, in place of methanol as the magnesium lactate solvent, one may use any low boiling polar organic liquid solvent which is capable of simultaneously dissolving magnesium lactate and an amount of sulfuric acid sufficient to convert the magnesium to magnesium sulfate. In place of lime, any basic alkaline earth metal compound can be used to transform free lactic acid into an alkaline earth metal lactate. In place of alkali sodium compounds, one may use corresponding alkali metal compounds such as those of potassium or lithium. Before, or after the removal of insoluble phytates or other insoluble alkaline earth metal compounds, one may resort to additional refining steps such as carbon refining, or treatment with bentonites or various diatomaceous earths.

In place of sulfuric acid as the reagent for precipitating the magnesium of the magnesium lactate dissolved in a polar solvent, one may use other organic solvent soluble acids which produce insoluble magnesium compounds. Thus, in place of the sulfuric acid dissolved in the methanol, one may use phosphoric acid and thereby produce magnesium phosphate and free lactic acid.

To increase the insolubility of magnesium phosphate in either aqueous or polar solvent media, one may add carbon dioxide. Thus, the presence of $CO_2$ in a phosphoric acid liquor which is to be added to a magnesium lactate solution, will minimize the slight solubility of magnesium phosphate in water.

Instead of adding molasses to steepwater as a low cost lactic fermentable carbohydrate, similar low cost results may be obtained by adding pasted crude amylaceous material such as degerminated corn meal pastes or other pasted cereal by-products; and then adding to the dilute corn steepwater during the lactic acid incubation a low cost crude amyloglucosidase enzyme liquor. This will result in the simultaneous creation of dextrose during the lactic acid fermentation, and the concomitant conversion of this dextrose to lactic acid.

What I claim as new and desire to secure by Letters Patent of the United States is as follows:

1. The process for removing a refined metal lactate from a crude lactic acid solution which comprises: blending light steepwater with molasses, lactating the blended liquors, neutralizing the resulting lactated liquor with a basic magnesium compound, removing the resulting magnesium phytate precipitate, cooling the remaining crude magnesium lactate solution to a magnesium lactate crystallizing temperature, removing the resulting high purity metal lactate crystals, washing the said crystals with a cold dilute magnesium lactate solution, and dehydrating the washed crystals.

2. The process for removing a refined metal lactate from a crude lactic acid solution which comprises: lime-neutralizing a hot lactated steepwater, removing the resulting calcium phytate precipitate, adding sufficient magnesium sulfate to precipitate the calcium ion and convert the calcium lactate to magnesium lactate, filtering off the insoluble calcium salts, cooling the filtrate to a magnesium lactate crystallizing temperature, removing the high purity magnesium lactate crystals, washing the said crystals with a cold magnesium lactate solution, and drying the washed crystals.

3. The process of claim 2 wherein the dried magnesium lactate is dissolved in a sulfuric acid acidified anhydrous methanol liquor and the resulting magnesium sulfate precipitate is freed of acidified methanol contamination and subsequently reused as a reagent for transforming another batch of calcium lactate solution into a magnesium lactate solution.

4. A method for lactating molasses and obtaining a refined alkali lactate from a crude lactic acid liquor which comprises: incubating molasses in the presence of steepwater containing live lactic acid microorganisms, neutralizing the mixture of lactated molasses and steepwater with a basic alkaline earth compound, removing the resulting insoluble organic alkaline earth salts, adding sufficient magnesium sulfate to the remaining solution to precipitate the soluble alkaline earth ions, removing the resulting precipitate, adding sufficient alkali to the remaining solution to precipitate the magnesium ion in the form of an insoluble inorganic magnesium compound, and removing the said magnesium compounds from the remaining alkali lactate solution.

5. The process of claim 4 wherein the said removed inorganic magnesium compound is converted to an aqueous magnesium sulfate solution and the latter is subsequently reused for converting calcium lactate liquors to magnesium lactate solutions.

6. The process of claim 4 wherein the insoluble magnesium compound precipitate is from the group consisting of magnesium hydroxide, magnesium carbonate and magnesium phosphate.

References Cited

UNITED STATES PATENTS

| | | | |
|---|---|---|---|
| 1,459,395 | 6/1923 | Hamburger | 195—48 |
| 2,232,554 | 2/1941 | Muller | 195—48 X |
| 2,474,046 | 6/1949 | Fries | 195—48 |
| 2,712,516 | 7/1955 | Kooi et al. | 195—48 |

LIONEL M. SHAPIRO, *Primary Examiner.*

U.S. Cl. X.R.

99—9, 2; 260—527, 535